Dec. 13, 1960
A. BANNER
2,964,152
FLUID PRESSURE OPERATED RELEASABLE TORQUE
TRANSMITTING APPARATUS
Filed March 15, 1956
3 Sheets-Sheet 3
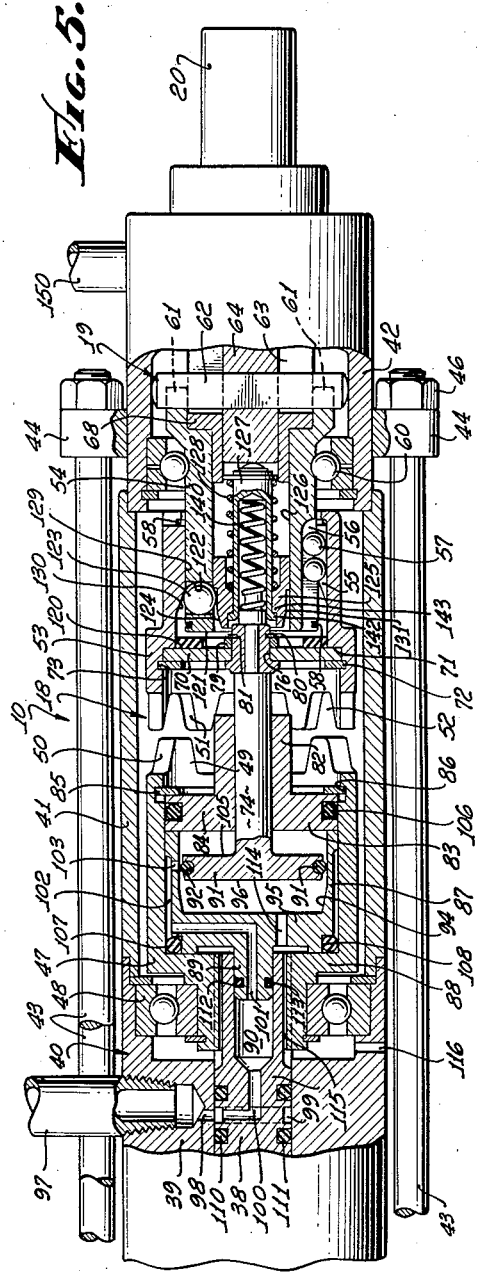
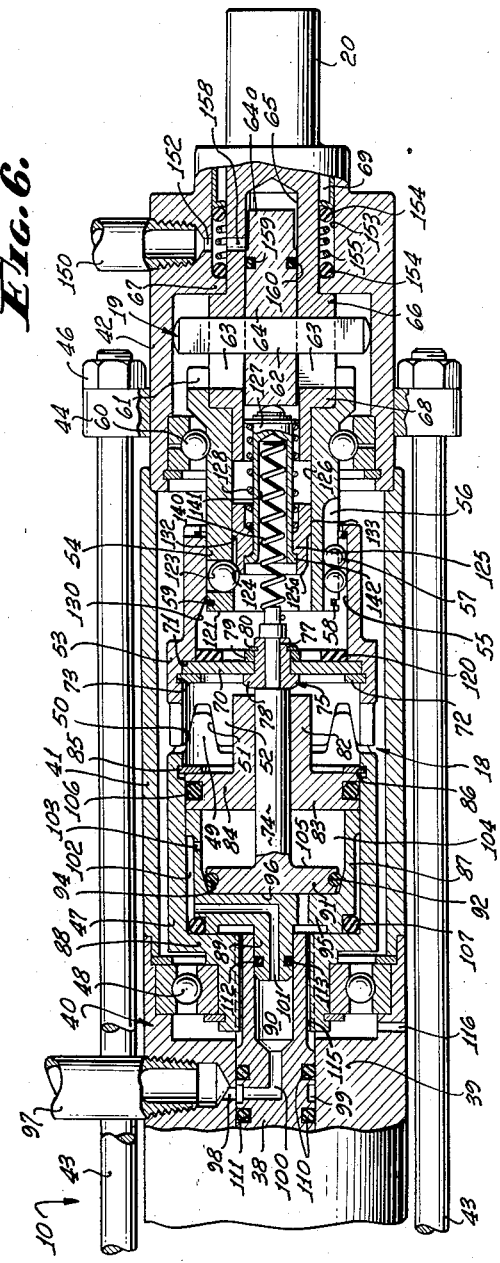
INVENTOR.
ARTHUR BANNER
BY
Bernard Kriegel
ATTORNEY.

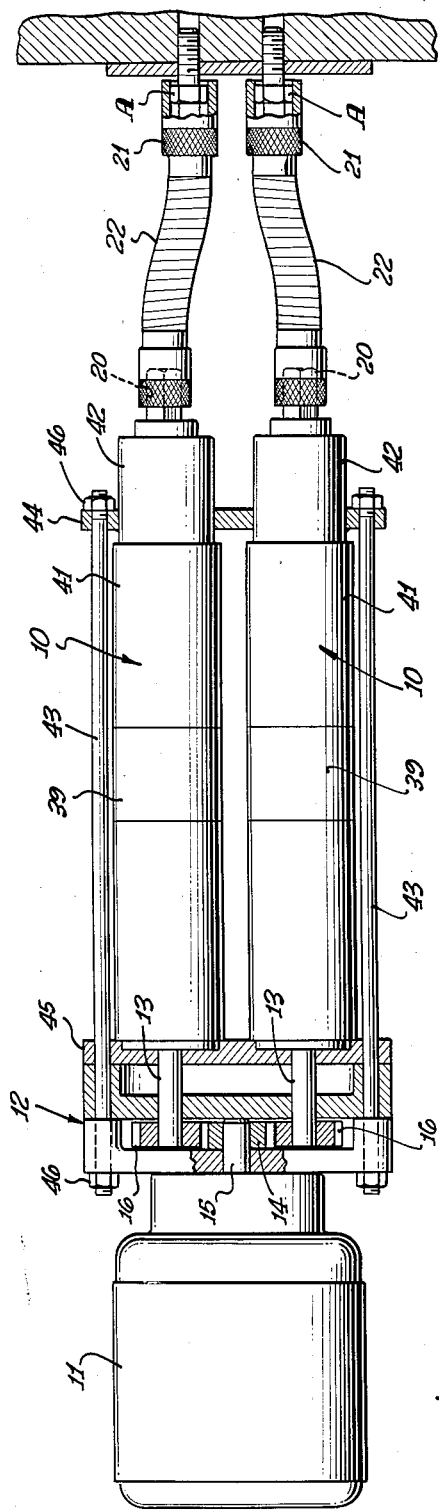

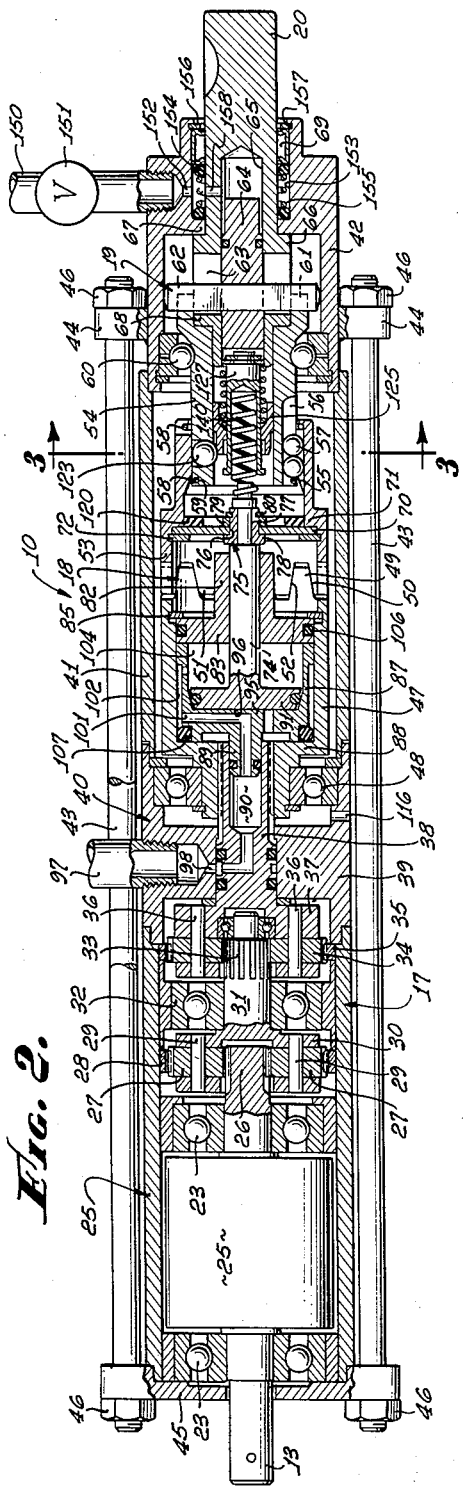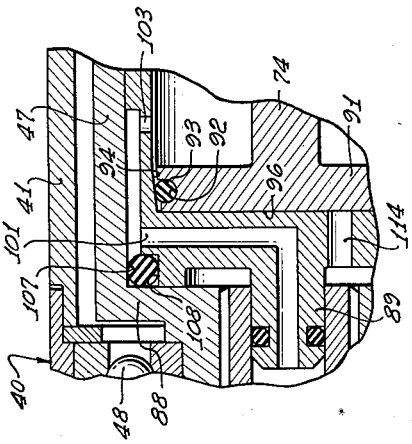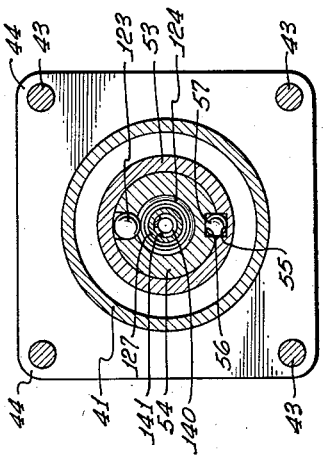

United States Patent Office 2,964,152
Patented Dec. 13, 1960

2,964,152

FLUID PRESSURE OPERATED RELEASABLE TORQUE TRANSMITTING APPARATUS

Arthur Banner, Rivera, Calif., assignor, by mesne assignments, of one-half to Henry T. M. Rice, San Gabriel, and one-half to Bernard Kriegel, Los Angeles, Calif.

Filed Mar. 15, 1956, Ser. No. 571,766

9 Claims. (Cl. 192—56)

The present invention relates to torque transmitting apparatus, and more particularly to clutch devices that release automatically when a predetermined torque is transmitted through them.

A plurality of automatically releasable clutch devices have been used to effect simultaneous tightening of a plurality of threaded fastening elements, such as nuts or screws. As a practical matter, tightening of all of the fastening elements to the desired torque value does not occur at the same instant. One element will be tightened before another, and the clutch device associated therewith will release before another clutch device releases. Where a common prime mover is used for simultaneously driving all of the clutch devices, it is found that the shock incident to release of one of the clutches acts through the prime mover and the gearing, or other mechanism connected thereto, to cause premature release of one or more of the other clutches.

Accordingly, it is an object of the present invention to provide a gang clutch apparatus for simultaneously tightening a plurality of threaded fastening elements, in which any shock loads due to tightening of one element and release of its associated clutch, before another element is fully tightened, cannot act through the common prime mover to prematurely release another clutch.

In apparatus for effecting simultaneous tightening of a plurality of threaded fastening elements, it has heretofore been difficult to operate simultaneously upon closely spaced elements. The releasable clutch devices were such as to prevent their close spacing with respect to one another, placing serious limitations on their range of spacing and use.

Another object of the invention is to provide a gang apparatus for simultaneously tightening a plurality of threaded fastening elements that are closely spaced to one another.

An additional object of the invention is to provide a torque releasable clutch apparatus, particularly useful in tightening a threaded fastening element, in which the clutch is reengageable or resettable without the necessity for moving the entire apparatus with respect to the work.

A further object of the invention is to provide an improved detent or latch mechanism for releasably locking a torque releasable clutch in its disengaged position, the clutch being incapable of inadvertently rendering the latch mechanism ineffective. Because of the improved latch mechanism, the retention of the clutch in disengaged position is assured, the axial movement of the clutch parts being ineffective to release the latch mechanism from its clutch retaining position.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a side elevation of a gang or multiple releasable torque transmitting apparatus;

Fig. 2 is a longitudinal section through one of the torque transmitting mechanisms, with all of its parts in driving engagement with one another;

Fig. 3 is a cross-section taken along the line 3—3 on Fig. 2;

Fig. 4 is an enlarged fragmentary section of part of the valve mechanism forming part of the torque transmitting apparatus;

Fig. 5 is a view corresponding to Fig. 2, with the primary clutch in disengaged position;

Fig. 6 is a view similar to Fig. 2, with the primary clutch reengaged and the secondary clutch in disengaged position.

The apparatus disclosed in the drawings includes a plurality of releasable torque transmitting apparatus 10, which are particularly designed for tightening a plurality of associated threaded fastening elements A simultaneously. Each torque transmitting apparatus 10 can be used alone, but the arrangement disclosed offers certain advantages when a plurality of torque transmitting apparatus is used, driven from a common power source, such as a prime mover or motor 11, suitably mounted on the frame 12 of the apparatus. Each releasable torque trasmitting device 10 is also suitably mounted on and carried by the frame of the apparatus, having a drive shaft 13 which is rotated by the motor 11 by virtue of the meshing of the pinion 14 on the motor shaft 15 with a gear 16 on the drive shaft of the torque transmitting apparatus itself.

The rotation imparted by the motor 11 to the shaft 13 of each torque transmitting apparatus is transmitted through reduction gearing 17 to a torque releasable primary clutch 18, from where the torque is transmitted through a secondary clutch 19 to a spindle 20 operatively associated with a threaded fastening element A, which may be, for example, a nut or a screw. The spindle has a socket 21, or screw driver bit, connected thereto which can be applied to the nut or screw. An intervening mechanism may be disposed between the spindle 20 and the socket 21, or the like. As an example, a flexible shaft connection 22 may be provided between the spindle and the socket wrench or screw driver bit, or the motion may be transmitted through suitable mechanism embodying universal joints, enabling the socket 21, or screw driver bit, to be out of alignment with the spindle 20 of the torque transmitting apparatus 10.

As stated above, the motor pinion 14 meshes with a gear 16 on the shaft, which is rotatably mounted in longitudinally spaced bearings 23 carried within the casing or housing 24 of the apparatus. A flywheel 25 of proper mass is secured to the shaft between the spaced bearings, and can have a required amount of inertia stored therein. The shaft 13 terminates in a sun gear 26 meshing with planet pinions 27 engaging in orbit gear 28 suitably secured to the gear case or housing 24. The planet pinions are rotatably mounted on pins 29 supported in a planet carrier 30 integral with a shaft 31 rotatably mounted in a suitable bearing 32 carried in the housing 24.

The shaft 31 has a sun gear 33 integral therewith meshing with another set of planet pinions 34 engaging an orbit gear 35 suitably secured to the gear casing 24, these planet pinions being rotatably mounted on pins 36 mounted in a planet carrier 37 integral with the primary clutch drive shaft 38. This latter shaft is rotatable within a transverse wall 39 of the rear housing section 40 of the clutch mechanism, which section abuts, and is piloted within, the forward portion of the gear housing 24, thereby holding the housing sections 24, 40 in alignment with each other. The rear housing section 40 has its forward portion receiving the rearward portion of an intermediate housing section 41, which, in turn, receives the rearward portion of a forward housing section 42. All of the housing sections 24, 40, 41, 42 are secured to one another by a plurality of tie rods 43 extending through a plate or lugs 44 fixed to the forward clutch housing section 42 and also through an end plate 45 engaging the rear portion of the gear case 24, there being nuts 46 threaded on the ends of the rods 43 and engaging the plates 44, 45 for the purpose of securing the various housing members to one another, wherein they operate as a functionally integral housing unit.

The drive shaft 38 of the primary clutch is suitably splined to the driving member 47 of the latter, which is rotatably supported in a bearing 48 carried within the rear housing section 40. The clutch driving member 47 is of generally cup-shaped form, being provided with axially extending clutch teeth 49 having inclined or cam type of driving faces 50 engaging companion inclined faces 51 on driven clutch teeth 52 provided on the driven member 53 of the primary clutch 18. The rotation of the driven member 53 is imparted to the driving member 54 of the secondary clutch 19 through a slidable spline connection. This spline connection includes opposed longitudinal grooves 55, 56 in the driven member 53 and the driving member 54 of the secondary clutch, which receive one or a plurality of ball elements 57 therewithin that function as rollable keys serving to transmit the rotation of the driven member 53 to the secondary driving member 54, while allowing the driven member 53 to shift axially along the driving member 54. The balls 57 are prevented from dropping out of the longitudinal grooves 55, 56 by split snap rings 58 located within grooves 59 in the rear end portion of the secondary clutch driving member 54 and also in the forward end portion of the primary clutch driven member 53.

The secondary clutch driving member 54 is rotatably mounted within the rear portion of the forward housing section 42 through the agency of a ball bearing 60 which serves to transmit radial loads between the secondary driving member and the housing section, as well as to resist axial displacement of the secondary driving member 54.

The driving member of the secondary clutch is provided with a plurality, such as a pair, of diametrically opposed clutch teeth or dogs 61 engageable with a transverse pin 62 extending through a transverse and elongate slot 63 formed through the rearward portion of the spindle or driven member 20 of the secondary clutch 19. This pin 62 may be square or rectangular in cross-section, and will transmit the rotation of the driving member 54 of the secondary clutch to the spindle. The transverse pin passes through and is fixed to a piston or plunger 64 slidable coaxially within a bore 65 in the spindle, the forward portion 64a of the plunger being constituted as a piston disposed within the spindle cylinder or bore. The spindle itself is prevented from moving axially with respect to the forward housing section 42 by virtue of a forward shoulder 66 engaging the end wall 67 of the forward housing section, and also by virtue of a rearward shoulder 68 engaging the driving member 54 of the secondary clutch. The spindle has its forward position rotatably mounted in roller bearing 69, the spindle 20 being adapted for rotational movement relative to the driving member 54 of the secondary clutch, but being incapable of any substantial axial movement with respect thereto. The secondary clutch 19 is engaged or disengaged by axial shifting of the plunger 64 and the transverse pin 62 extending therethrough.

The rotation of the driving member 47 of the primary clutch is transmitted to the driven member 53 through the coengaging cam type of clutch teeth 49, 52. The torque being transmitted between these teeth tends to shift the driven member 53 axially out of engagement from the driving member, because of the slope of the teeth faces 50, 51. The driven clutch teeth 52 are held in engagement with the driving teeth 49 against the disengaging force associated with the transmitted torque by a fluid pressure differential device, such as a device operated by air pressure. Thus, a plate 70 is secured against axial movement with respect to the driven member 53 of the primary clutch by bearing against a shoulder 71 of the driven member, being retained in this position by a suitable split snap ring 72 disposed in a groove 73 in a driven member. A valve stem 74 is attached to this plate against axial movement with respect thereto by passing a two-piece hub member 75 through a central bore 76 in the plate 70, the two halves of the hub member being received within an elongate peripheral groove 77 in the valve stem. The hub member 75 has a flange 78 engaging the rear face of the plate, the other face of the plate engaging a washer 79 held thereagainst by a contractile split snap ring 80 disposed in a peripheral groove 81 in the hub 75. The forward end of the hub 75 engages one side of the valve stem groove 77, whereas the rearward end of the hub engages the other face of the groove. By virtue of the parts just described, the plate and hub device 70—81 serves to secure the driven clutch member 53 to the valve stem 74 against relative movement with respect to one another.

The valve stem 74 extends through the hub portion 82 of a forward end closure member 83, which forms part of a valve body disposed within the driving member 47 of the primary clutch. The end closure 84 is prevented from moving in a forward direction with respect to the driving member 47 by engaging a split snap ring 85 disposed within an internal groove 86 in the driving member, and also by engaging the forward end of a cup-shaped body member 87, the other end of which engages the base portion 88 of the driving member 47, this cup-shaped driving member having a rearwardly extending pilot portion 89 disposed within a central bore 90 in the drive shaft 38.

The rearward end of the valve stem 74 is secured to or is integral with a valve head 91 disposed within the valve body 87. This valve head has a peripheral groove 92 containing a suitable seal ring 93, such as a rubber or rubber-like O ring, which is adapted to engage a slightly inclined valve seat 94 adjacent the base 95 of the valve body member 87. Such engagement occurs when the rear face 96 of the valve head 91 engages the base 95 of the valve body member, in order to limit the extent of compression of the seal ring 93 against its companion seat 94.

The valve head 91 is urged and held in its rear position within the valve body 87, with its rearward face 96 engaging the base 95 of the valve body member, by air under pressure. Such air under pressure is obtained from a suitable source (not shown), flowing through a suitable air line 97 secured to the transverse wall 39 of the clutch housing that has an inlet port 98 opening into a peripheral groove 99 provided in the drive shaft. From this peripheral groove 99, an air passage 100 extends into the central bore 90 of the drive shaft, which communicates with a passage 101 opening through the rear end of the pilot portion 89 of the valve body 87 and then extending transversely to a peripheral groove 102 between the periphery of the valve body member and the inner wall of the clutch driving member 47. The air under pressure then flows through an inlet port 103 extending through the wall of the valve body member 89 into the interior or chamber 104 of the valve body itself, this air under pressure exerting its force against the forward face 105 of the valve head 91, and holding it in engagement with the base 94 of the valve body, and with the seal ring 93 engaging its companion seat 94.

It is apparent that air under pressure is delivered into the chamber 104, which has a relatively small volume. The forward end of the chamber is defined by the valve body closure plate 83, leakage in a forward direction from the chamber being precluded by a peripheral seal 106 on the closure member engaging the inner wall of the clutch driving member 47. The valve stem 74 has a sufficiently close sliding fit within the hub 82 of the plate to prevent leakage in a forward direction around the stem. Leakage of air from the chamber 104 in a rearward direction is prevented by a seal ring 107, such as a rubber or rubber-like O ring, disposed in a groove 108 defined between the base 88 of the clutch driving member 47 and the valve body member 87 itself, this seal ring engaging the inner wall of the clutch driving member 47, as well as its base portion.

Leakage of air from the chamber 104 in a rearward direction is prevented whenever the valve head 91 is disposed in the rearward position, with its seal ring 93 engaging its companion tapered seat 94. It is only necessary for the valve head to move a slight distance in a forward direction, for example, about one-sixteenth of an inch, to disengage the seal ring from its companion seat, which then allows the air from the chamber 104, and acting on the forward face 105 of the valve head 91, to pass around the periphery of the valve head and the seal ring to the rearward face 96 of the valve head, thereby equalizing the pressure on both sides of the head. Such equalizing effectively nullifies the force of the air pressure tending to hold the valve head 91 with its seal ring 93 in engagement with the valve seat 94, this force also being exerted to the driven member 53 through the valve stem 74 and plate 70, and tending to hold its teeth 52 engaged with the driving member clutch teeth 49.

It is further to be noted that leakage of air from the peripheral groove 99 in the drive shaft 38 is prevented by suitable seal rings 110, such as rubber or rubber-like O rings, disposed in peripheral grooves 111 in the drive shaft on opposite sides of its passage region 100 and sealingly engaging the transverse housing member wall 39. Similarly, leakage of fluid around the pilot portion 89 of the valve body 87 is prevented by a suitable seal ring 112, such as a rubber or rubber-like O ring, disposed in a peripheral groove 113 in the pilot portion and engaging the wall of the shaft bore 90.

When the valve head 91 is shifted forwardly from its seat 94 by the driven member 53, the air pressure not only equalizes on both sides of the head, but it can also exhaust from the valve body chamber 104 through an outlet or exhaust passage 114 which may be of relatively small area, such air under pressure passing between the splines 115 in the drive shaft 38 into the housing 40 externally of the shaft, from where the air can exhaust from the housing to atmosphere through a suitable outlet port 116 in the housing. Accordingly, when the valve head 91 has been shifted forwardly out of engagement from the base 95 of the valve body member, which will also disengage the valve seal ring 93 from the valve seat 94, very little air is lost from the chamber 104, despite the fact that it is still being supplied with air under pressure from the inlet line 97. This is due to the restriction of flow offered by the relatively small area of the outlet passages 114, 116.

The air under pressure acting on the forward face 105 of the valve head tends to hold it engaged with the valve body base 95, with its seal ring 93 in sealing engagement with the valve seat 94, which thereby tends to hold the driven clutch teeth 52 in full meshing engagement with the driving clutch teeth 49. However, when the torque being transmitted is sufficient to overcome the holding force of the air under pressure within the valve body, the cam teeth 49, 52 shift the driven member 53 in a forward direction, to disengage the valve head seal 93 from its companion seat 94. Inasmuch as it only takes a slight movement of the valve head to effectively remove substantially all of the holding force of the air pressure upon it, full disengagement between the teeth 49, 52 occurs under comparatively no-load conditions, the driven member 53 being shifted longitudinally along the driving member 54 of the secondary clutch. The driven member 53 is moved forwardly, its forward motion being arrested and limited by a rubber or rubber-like bumper member 120 secured to the forward face of the plate 70 and adapted to engage the rear end 121 of the driving secondary clutch member 54.

The driven member 53 is retained in the above disengaged position by a latch device. The driving member 54 of the secondary clutch 19 has a plurality of radial holes 122 therein, each of which contains a ball detent or latch member 123. The inner portions of these ball detent members 123 are engaged by a tapered rearward cam face 124 on a latch sleeve or spindle 125, which is slidable within the central bore 126 of the driving member 54 of the secondary clutch, and also along a latch release member 127, the forward end of which engages the rear end of the plunger 64. A helical compression spring 128 constantly urges the latch sleeve 125 in a rearward direction, causing its cam face 124 to tend to shift the latch balls 123 in a radial outward direction. However, such shifting cannot occur when the driven clutch member 53 is fully engaged with the driving clutch member 47, since the balls then engage the inner cylindrical surface 129 of the driven member. When the driven member 53 is shifted in a forward direction to a clutch disengaged position, an internally tapered face 130 on the driven member, which diverges in an outward and rearward direction, becomes disposed opposite the balls 123, allowing the latter to be shifted radially outward by the tapered face 124 of the sleeve 125, a cylindrical portion 131 of the latch sleeve then being disposed behind the balls, holding them outwardly in engagement with the tapered holding face 130 on the driven member 53, to secure the latter in its fully released position with respect to the clutch teeth 49 of the driving member.

The cylindrical surface 131 of the latch sleeve terminates at a shoulder portion 132 extending to an enlarged cylindrical surface 133 of the latch sleeve that is slidable within the bore 126 of the secondary clutch driving member 54, this shoulder 132 engaging the balls 123, which then prevent further rearward movement of the latch member 125 along the secondary clutch driving member. The extent of movement of the latch sleeve 125 in a rearward direction is limited in order that its rear end 125a cannot engage any portion of the valve stem 74, hub 75 and plate 70 connected to the driven clutch member 53, when the rubber bumper 120 contacts the rear end of the secondary clutch driving member 54. By limiting the extent of rearward movement of the latch sleeve 125, no part connected with the driven member 53 can engage the latch sleeve and tend to shift it in a forward direction to a position in which the balls 123 will be released from their holding condition against the tapered face 130 of the driven member 53 of the primary clutch 18. Accordingly, assurance is had that the driven member 53 will be held latched in its released position until it is purposely conditioned to permit its reengagement with the driving clutch member 47 of the primary clutch device.

For the purpose of releasing the latch balls 123, it is necessary to shift the secondary clutch transverse pin 62 out of engagement with the driving lugs or teeth 61 of the secondary clutch 19. This action occurs as a result of forward movement of the plunger and piston 64 under the influence of a return spring 140 disposed within a bore 141 in the latch retracting member 127, one end of the spring engaging the latter and the other end engaging the valve stem 74. Thus, the spring 140 is tending to shift the transverse pin 62 of the secondary clutch to a disengaged position, and is also tending to shift the driven member 53 of the primary clutch toward a position of clutch engagement with the driving member 47 of the primary clutch.

When the plunger 64 is permitted to move in a forward direction within the spindle 20, the spring 140 acts through the retracting member 127 and plunger to disengage the pin 62 from the lugs or teeth 61 of the secondary clutch driving member, which movement is accompanied by forward movement of the latch retracting member 127. This latter member has a flange 142 at its rearward end engaging a companion shoulder 143 on the latch sleeve. As the spring 140 shifts the retracting member 127 and plunger 64 in a forward direction, the flange 142 engages the latch sleeve 125 to shift it also in a forward direction, moving the cylindrical periphery 131 of the latch sleeve from behind the balls 123 and allowing the tapered face 130 of the driven member 53 to shift the balls inwardly to their initial postion upon the tapered cam face or nose 124 of the latch sleeve. The driven member 53 of the primary clutch is shifted in the rearward direction by the return spring 140 until its clutch teeth 52 mesh with the driving member clutch teeth 49, at which time the inner cylindrical surface 129 of the driven member is disposed in alignment with the latch balls 123.

The spring 140 is capable of shifting the plunger 64 and the transverse clutch pin 62 in a forward direction, to disengage the secondary clutch 19, and tends to hold the secondary clutch in the disengaged position. Rearward movement of the plunger 64 and the transverse pin 62 is accomplished by air under pressure passing through a suitable line 150 and through a suitable control valve 151 into the forward housing section 42, there being a port 152 in such housing section communicating with a counterbore 153 in the forward housing section surrounding the spindle 20. Leakage of air from the counterbore in both longitudinal directions is prevented by longitudinally spaced seal rings 154 on opposite sides of the port 152 engaging the inner wall of the counterbore 153 and the periphery of the spindle 20, these seal rings being held in proper sealing relation to the surfaces that they engage by a helical compression spring 155 therebetween and bearing thereagainst. The ball bearing structure 69 engages the forward seal ring 154, this structure being held in appropriate position by a split snap ring 156 which engages it and which is disposed within an internal groove 157 in the forward housing section.

Air from the counterbore 153 passes through a side port 158 in the spindle 20 into its cylindrical bore 65, this air under pressure then being capable of acting on the forwardly facing portion of the plunger piston 64a to urge the plunger in a rearward direction and engage the transverse pin 62 with the secondary clutch driving member teeth 61. Leakage of fluid from the cylinder 65 along the plunger is prevented by a suitable seal ring 159, such as a rubber or rubber-like O-ring, disposed in a ring groove 160 in the plunger and engaging the cylinder wall.

In the operation of each of the clutch release mechanisms disclosed, the parts of each device 10 may be assumed initially to occupy the position disclosed in Fig. 2, in which the valve 151 has been opened to allow air to flow into the spindle cylinder 65, to shift the plunger 64 to the rear and engage the transverse pin 62 with the secondary clutch driving dogs 61, the return spring 140 exerting a force upon the driven primary clutch member 53 to hold it in proper clutching engagement with the companion driving clutch member 47. The valve head 91 is then disposed in engagement with the base 95 of the valve body, and with its seal ring 93 sealingly engaging its companion valve seat 94. Air under the desired pressure is allowed to flow through the passages 99, 99, 100, 101, 103 into the valve chamber 104, this air acting upon the forward face 105 of the valve head and tending to hold the latter and the driven member 53 in the rearward direction, to maintain the primary clutch 18 in a driving position. The socket head 21, or screw driver bit, connected to the spindle 20 may then be applied to the nut or screw A and the drive shaft 38 rotated, the rotation being transmitted through the clutch teeth 49, 52 to the driven member 53, and from the driven member through the splines 55—57 to the driving member 54 of the secondary clutch, from where it passes through the transverse pin 62 to the spindle 20 and to the mechanism 52, 21 that connects the spindle 20 to the threaded fastening element A. As the threaded fastening element is tightened, the torque transmitted increases, this torque acting through the inclined coengaging clutch teeth 49, 52 and tending to shift the driven clutch member 53 in a rearward direction out of engagement from the driving clutch member 47. This action is resisted by the holding force of the air pressure action upon the valve head 91. To some extent, the holding force is also being provided by the clutch reengaging spring 140, which is preferably made comparatively light, so that its force is rather small as compared to the holding force of the air pressure against the valve head.

When the predetermined force or torque is transmitted corresponding to the holding force of the air under pressure on the valve head 91, the driven member 53 is shifted in a forward direction. The initial shifting motion moves the valve head away from the base of the valve body to disengage the seal ring 93 from its companion seat 94. As soon as such disengagement occurs, the air on the forward side of the head can pass around the valve head to its rearward side, equalizing the pressure on the head and reducing the holding force due to the air pressure to substantially zero. Accordingly, the torque transmitted can then act through the cam clutch teeth 49, 52 to fully shift the driven member 53 in a forward direction to a completely disengaged position from the driving member 47, under substantially no-load conditions.

As soon the tapered holding face 130 of the driven member comes opposite the latch balls 123, a spring 128 urges the latch sleeve 125 in a rearward direction, to force the balls outwardly against the holding face 130 and thereby secure the driven member 53 in a disengaged position with respect to the driving member 47, the rearward movement of the latch sleeve, as above noted, being limited by engagement of its shoulder 132 with the latch balls (Fig. 5).

The drive to the spindle 20 and the socket head 21 is thereby disrupted. The secondary clutch 19, however, remains in engagement.

The primary clutch 18 may be reset as a result of disengaging the secondary clutch 19. Such disengagement occurs by bleeding off the air under pressure to the cylinder 65 by suitable manipulation of the valve 151, which causes the spring 140 to shift the reset rod 127 and the plunger 64 in a forward direction to disengage the transverse pin 62 from the teeth 61 of the secondary clutch. The forward motion of the reset rod 127 under the influence of the spring 140 causes its flange 142 to engage the sleeve 125 and shift it forwardly out of its retaining position behind the latch balls 123, whereupon the spring 140, is effective to shift the driven member 53 back into full engagement with the driving member 47, and also to place the valve head 91 in its rearward position with its seal ring 93 reengaged with its seat 94. Any air behind the valve head 91 escapes through the exhaust passages 114, 115, 116 (Fig. 6).

The secondary clutch 19 remains disengaged. In view of such disengagement, any rotation imparted to the primary clutch 18 is not supplied to the spindle 20 and to the socket 21 connected thereto. The motion will only be transmitted to the spindle upon suitably manipulating the valve 151 to cause air to reenter the spindle cylinder 65, which will again shift the plunger 64 in a rearward direction to engage the transverse pin 62 with the secondary clutch teeth 61. At the same time, such rearward movement shifts the rod 127 in a rearward direction, to space its flange 142 rearwardly away from the latch shoulder 143; however, the thimble or sleeve 125 cannot shift rearwardly, since the balls 123 are then in engagement with the inner cylindrical surface 129 of the driven clutch member 53. Air under pressure can then be supplied through the line 97 to the chamber 104, acting upon the forward face 105 of the valve head 91, to hold the primary clutch teeth 49, 52 in engagement with each other. The clutch mechanism 10 is now in a position to tighten another threaded fastening element, or to retighten a threaded fastening element that has been previously tightened.

The secondary clutch 19 is engaged and released without regard to movement of the releasable torque transmitting apparatus 10 as a whole with respect to the work. The spindle 20 is not movable axially relative to the housing 42, the shifting of the secondary clutch 19 occurring as a result of controlling the air under pressure into and out of the spindle cylinder 65. Inasmuch as reengagement of the secondary clutch is not dependent upon movement of the apparatus as a whole with respect to the work, the spindle 20 can be connected through suitable flexible couplings 22 and offset connections to the socket or bit 21, which then enables a multiplicity of units to be mounted in a common fixture or frame for use in tightening threaded fastening elements A that may be closely spaced to one another. The direct connection of spindles 20 to the work limits the minimum spacing of threaded fastening elements that could be operated upon simultaneously, the limitation being imposed by the transverse dimension of each torque transmitting apparatus 10.

In the use of a multiple or gang arrangement of torque transmitting apparatus for simultaneously tightening a plurality of threaded fastening elements through use of a common prime mover 11, difficulty has heretofore been encountered when one of the primary clutches 18 released, as a result of the tightening of one threaded fastening element, before another threaded fastening element was fully tightened, the shock incident to tightening or sudden stopping of the first-mentioned threaded fastening element being transmitted back through the clutches 18 and through the gearing to the prime mover 11, from where the shock was transmitted to another torque transmitting apparatus, sometimes causing premature release of its primary clutch. Accordingly, the threaded fastening element associated with this latter clutch would be inadequately tightened, and might, in fact, actually be in a loose condition.

The present invention overcomes the aforenoted difficulty by interposing an energy storing flywheel 25 between the common prime mover 11 and each of the primary clutches 18. It is found that the flywheel and the substantial gear reduction between it and the primary clutch acts as an effective shock absorber, which precludes the shock incident to full tightening of the threaded fastening element from being transmitted back through the apparatus to the primary clutch of another torque transmitting apparatus. This is due to the fact that most of the energy for tightening the threaded fastening element is stored in the flywheel 25 and the gearing 26—37, the shock incident to tightening of the threaded fastening element and release of the primary clutch being transferred back only to the energy storing apparatus, very little of such shock passing back to the common prime mover 11, from where it could pass to another torque transmitting apparatus. In the specific example disclosed, the double reduction planetary gearing 26—37 between the flywheel 25 and the drive shaft 38 of the primary clutch 18 can provide a gear ratio of about 25:1, so that any shock load in the primary clutch would only be represented by about 1/25 of its value in the region of the flywheel 25 and the shaft 13 connected thereto. Accordingly, the flywheel and the extensive gear reduction between it and the shaft 38 of the primary clutch serves to dampen and reduce considerably the shock loads.

In effect, the prime mover 11 is a device for bringing the various flywheels 25 up to their proper speed, which may, for example, be of the order of 10,000 r.p.m., thereby storing more than the necessary energy therein for fully tightening an associated threaded fastening element A. Assuming, by way of example, that the double gear reduction in the planetary transmission is about 25:1, then the speed of the flywheel 25 and its shaft 13 will have been reduced to about 400 r.p.m. in the drive shaft 38 and primary clutch driving member 47. Since the prime mover 11 is essentially a mechanism for storing energy in the flywheel 25 and associated gearing, any shock load that might be induced in any of the apparatus cannot effectively pass back through the reduction gearing and flywheel to the prime mover, since the kinetic energy in the former is tending to resist the rearward transmission of such shock load.

With the gang apparatus disconnected from the work, the motor 11 is started, the primary clutches 18 all being engaged by the reengaging springs 140 and air under pressure then allowed to pass at the desired pressure into the clutch chambers 104. The spindles 20 of the several units of apparatus are then coupled to the multiplicity of threaded fastening elements A. After the motor 11 is rotating at the required speed, air under pressure is allowed to pass into the spindle chambers 65, which will engage all of the secondary clutches 19, thereby placing all of the spindles in driving relation to the prime mover. When the secondary clutches 19 are engaged, the flywheels 25 are all rotating at the proper speed and have ample energy stored therein to effect the desired tightening of the threaded fastening elements, which are then run down simultaneously. When each of the threaded fastening elements is tightened to the desired degree, its associated primary clutch 18 is automatically released and latched in the release position, which enables the prime mover 11, flywheels 25 and associated gearing, and driving member 47 of the primary clutch to continue rotating. The other parts of the apparatus 10 forwardly of the primary clutch will, of course, be stationary. As stated above, any shock loads incident to full tightening of a threaded fastening element are not transmitted back through the gearing, flywheel, and prime mover to another threaded fastening element.

After all of the threaded fastening elements A have been tightened to the desired torque value, all of the primary clutches 18 are latched in disengaged position. The mechanisms 21 coupled to the threaded fastening elements A can now be disengaged therefrom and applied to another set of threaded fastening elements, or, if desired, the threaded fastening elements can be retightened to insure their tightening to the proper torque value, by releasing the air pressure in the spindle cylinders 65, to cause the return springs 140 to disengage the secondary clutches 19 and to effect latch release and reengagement of the primary clutches 18, after which the air pressure to the spindle cylinders 65 can be reestablished to reengage the secondary clutches 19 and effect another tightening of the threaded fastening elements, which will, of course, be followed by release of all of the primary clutches 18.

The foregoing cycle of operation can be repeated on the same set of threaded fastening elements, or, as is usual, only a single stage of tightening is necessary. The apparatus can then be applied to another set of threaded fastening elements and the cycle of operation repeated.

The inventor claims:

1. In torque transmitting apparatus: driving and driven members; coengageable axially extending clutch elements on said members effecting a rotatable driving connection between said members and responsive to the torque being transmitted to shift said members axially relative to each other and release said clutch elements from one another; one of said members having a holding surface thereon; detent means; means preventing axial movement of said detent means; a holding device engaging said detent means and movable axially in one direction to a position maintaining said detent means engaged with said holding surface to secure said one member axially away from said other member to maintain said clutch elements released from one another, said holding device having a first surface engaging said detent means to maintain said detent means engaged with said holding surface and also having a second surface disposed substantially outwardly laterally beyond said first surface to provide an abrupt transverse stop shoulder between said first and second surfaces engageable with said detent means to limit axial movement of said holding device in said one direction; and means for shifting said holding device in the opposite direction to effect release of said detent means from said holding surface to allow said one member to move axially and reengage said clutch elements.

2. In torque transmitting apparatus: driving and driven members; coengageable axially extending clutch elements on said members effecting a rotatable driving connection between said members and responsive to the torque being transmitted to shift said driven member axially away from said driving member to release said clutch elements from one another; said driven member having a holding surface thereon; detent means; means preventing axial movement of said detent means; a holding device engaging said detent means and movable axially in one direction to a position maintaining said detent means engaged with said holding surface to secure said driven member axially away from said driving member to maintain said clutch elements released from one another; said holding device having a first substantially cylindrical surface engaging said detent means to maintain said detent means engaged with said holding surface and also having a second substantially cylindrical surface of a greater diameter than said first surface to provide an abrupt transverse stop shoulder between said first and second surfaces engageable with said detent means to limit axial movement of said holding device in said one direction; and means for shifting said holding device in the opposite direction to effect release of said detent means from said holding surface to allow said driven member to move axially and reengage said clutch elements.

3. In torque transmitting apparatus: a driving member; a first driven member; coengageable elements on said members effecting a rotatable driving connection between said members and responsive to the torque transmitted to release said elements from each other and axially shift said driven member; means providing a slidable splined connection rotatable with said driven member; a second driven member having a transverse slot therein; said means having axially extending clutch teeth; a plunger movable axially within said second driven member; a transverse pin extending through said plunger and slot and engageable with said teeth; means for shifting said plunger axially in one direction within said second driven member to engage said pin with said teeth; and means engaging said plunger and exerting a shifting force on said plunger in the opposite direction which is transmitted from said plunger to said pin to shift said plunger and pin in the opposite direction and disengage said pin from said teeth.

4. In torque transmitting apparatus: a driving member; a first driven member; coengageable elements on said members effecting a rotatable driving connection between said members and responsive to the torque transmitted to release said elements from each other and axially shift said driven member; means providing a slidable splined connection rotatable with said driven member; a second driven member having a transverse slot therein; said means having axially extending clutch teeth; a plunger movable axially within said second driven member; a transverse pin extending through said plunger and slot and engageable with said teeth; said second driven member having a cylinder therein; piston means on said plunger slidable in said cylinder; means for feeding fluid under pressure into said cylinder to shift said plunger axially in one direction within said second driven member to engage said pin with said teeth; and means engaging said plunger to shift said plunger in the opposite direction to disengage said pin from said teeth.

5. In torque transmitting apparatus: a driving member; a first driven member; coengageable elements on said members effecting a rotatable driving connection between said members and responsive to the torque being transmitted to axially shift one of said members to a position in which said elements are disengaged from each other; latch means for releasably holding said one member in such position; a second driven member; means including a releasable clutch for drivably connecting said first driven member to said second driven member; a plunger movable axially within said second driven member and operatively connected to said clutch; means for shifting said plunger axially in one direction within said second driven member to engage said clutch; and means movable in the opposite direction and engageable with said latch means to release said latch means from said one member and also engageable with said plunger to exert a shifting force on said plunger and movement of said plunger in the opposite direction which force and movement are transmitted in said opposite direction from said plunger to said clutch to disengage said clutch.

6. In torque transmitting apparatus: a driving member; a first driven member; coengageable elements on said members effecting a rotatable driving connection between said members and responsive to the torque being transmitted to axially shift one of said members to a position in which said elements are disengaged from each other; latch means for releasably holding said one member in such position; a second driven member; means including a releasable clutch for drivably connecting said first driven member to said second driven member; a plunger movable axially within said second driven member and operatively connected to said clutch; said second driven member having a cylinder therein; piston means on said plunger slidable in said cylinder; means for feeding fluid under pressure into said cylinder to shift said plunger axially in one direction within said second driven member to engage said clutch; and means movable in the opposite direction engageable with said latch means to release said latch means from said one member and also engageable with said plunger to shift said plunger in the opposite direction to disengage said clutch.

7. In torque transmitting apparatus: a driving member; a first driven member; coengageable elements on said members effecting a rotatable driving connection between said members and responsive to the torque being transmitted to axially shift said first driven member to a position in which said elements are disengaged from each other; latch means for releasably holding said first driven member in such position; a second driven member; means including a releasable clutch for drivably connecting said first driven member to said second driven member; a plunger movable axially within said second driven member and operatively connected to said clutch; said second driven member having a cylinder therein; piston means on said plunger slidable in said cylinder; means for feeding fluid under pressure into said cylinder to shift said plunger axially in one direction within said second driven member to engage said clutch; and means movable in the opposite direction and engageable with said latch to release said latch from said first driven member and also engageable with said plunger to shift said plunger in the opposite direction to disengage said clutch.

8. In apparatus for simultaneously rotating a plurality of threaded fastening elements; a releasable torque transmitting device for rotating each of said elements, each device including driven means, driving means for said driven means, coengageable elements on said driving and driven means effecting a rotatable driving connection therebetween and releasable from each other in response to the torque being transmitted therethrough, a rotatable inertia member, reduction gearing connecting said inertia member to said driving means; a rotatable prime mover; and means for simultaneously transmitting the rotary motion of said prime mover to all of said inertia members.

9. In apparatus for simultaneously rotating a plurality of threaded fastening elements; a releasable torque transmitting device for rotating each of said elements, each device including driving and driven members, coengageable axially extending clutch elements on said members effecting a rotatable driving connection between said members and responsive to the torque being transmitted to shift said members axially relative to each other and release said clutch elements from each other, a rotatable flywheel, reduction gearing connecting said flywheel to said driving member; a rotatable prime mover; and means for simultaneously transmitting the rotary motion of said prime mover to all of said flywheels.

References Cited in the file of this patent

UNITED STATES PATENTS

| | | |
|---|---|---|
| 2,069,882 | Hall | Feb. 9, 1937 |
| 2,616,311 | Lapsley | Nov. 4, 1952 |
| 2,619,815 | Nardone | Dec. 2, 1952 |
| 2,691,314 | Stevens et al. | Oct. 12, 1954 |
| 2,730,212 | Rice et al. | Jan. 10, 1956 |
| 2,743,635 | Shaff | May 1, 1956 |
| 2,743,636 | Shaff | May 1, 1956 |
| 2,780,332 | Stevens | Feb. 5, 1957 |
| 2,835,365 | Rice et al. | May 20, 1958 |